(12) United States Patent
Kreitmeier

(10) Patent No.: US 6,626,637 B2
(45) Date of Patent: Sep. 30, 2003

(54) COOLING METHOD FOR TURBINES

(75) Inventor: Franz Kreitmeier, Baden (CH)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 10/105,347

(22) Filed: Mar. 26, 2002

(65) Prior Publication Data

US 2003/0035714 A1 Feb. 20, 2003

Related U.S. Application Data

(60) Provisional application No. 60/312,785, filed on Aug. 17, 2001.

(51) Int. Cl.[7] ................................................. F01D 5/18
(52) U.S. Cl. ........................ 415/1; 415/115; 416/96 R
(58) Field of Search ............................. 415/1, 115, 116; 416/1, 95, 96 R

(56) References Cited

U.S. PATENT DOCUMENTS

| | | | |
|---|---|---|---|
| 3,903,691 A | | 9/1975 | Szydlowski |
| 4,003,200 A | | 1/1977 | Zerlauth |
| 4,249,371 A | | 2/1981 | Romeyke |
| 4,282,708 A | * | 8/1981 | Kuribayashi et al. ......... 60/778 |
| 5,388,960 A | | 2/1995 | Suzuki et al. |
| 6,146,090 A | * | 11/2000 | Schmidt ...................... 415/47 |

FOREIGN PATENT DOCUMENTS

| | | |
|---|---|---|
| DE | 928346 | 5/1955 |
| DE | 4129518 A1 | 3/1993 |
| DE | 19749452 A1 | 5/1999 |
| DE | 19823251 C1 | 7/1999 |
| GB | 2 094 404 A | 9/1982 |

* cited by examiner

*Primary Examiner*—Ninh H. Nguyen
(74) *Attorney, Agent, or Firm*—Burns, Doane, Swecker & Mathis, L.L.P.

(57) ABSTRACT

In a method for cooling a turbine (1), the supply of the cooling medium is regulated in accordance with the third power of the rotor rotational speed. The method is particularly employed in the period while the rotors run down after the termination of the on-load operation of the turbine (1). The method ensures that cooling takes place according to requirement and a critical phase with respect to vibrations of the long blades can not, as far as possible, be reached.

7 Claims, 3 Drawing Sheets

COOLING METHOD FOR TURBINES

This application claims the benefit of provisional application No. 60/312,785 filed Aug. 17, 2001.

FIELD OF THE INVENTION

The invention relates to a method for reliably cooling turbines such as air storage turbines and, in particular, for the period while the rotors run down after termination of the power operation.

BACKGROUND OF THE INVENTION

After the termination of the power operation of an air storage gas turbine by closing the valves for the supply of the working medium, the turbine rotor continues to rotate for a certain period. During this turbine run-down, also referred to as transient windage operation, a residue of the working medium is still present in the turbine. The dissipation of energy to the blading can then lead to a generation of heat which heats the turbine to an unallowable extent. For this reason, the blading and other turbine parts are cooled with air in order to avoid overheating of the turbine and ensure risk-free, transient windage operation. Such cooling is particularly important for those components which are located within the region of influence of blading with a length which is large in relation to the radius of the turbine rotor.

In known air storage gas turbines, the cooling air to the turbine is supplied as a function of the time after the closing of the turbine valves, in accordance with a method shown in FIG. 1. The full curve, which is also designated by $(m/m_0)_S$, shows the relative mass flow of the cooling air supplied, which mass flow is the consequence of a typical time-cycle valve control. The supply of cooling air only begins approximately 5 seconds after the rapid closure of the turbine valves and remains, as compared with the supply with a fully open valve, almost unaltered and only falls very slowly during a long phase. It then falls rapidly.

In such installations, it has been found that, during the first phase, the cooling air flow is located far above the actual requirement for cooling air, such as would be actually necessary for the removal of the heat generated. Because of this, the turbine components are cooled to temperatures which are far below the maximum permitted limiting temperature. This leads to higher transient stresses in the turbine components and these can reduce their life. In addition, the overdimensioned cooling air flow signifies an unnecessary loss of storage energy.

FIG. 2 shows, as a full curve, the variation of the relative flow coefficient $v/v_0$, $v$ being the ratio of the axial flow velocity to the peripheral velocity of the blades. The full curve $(v/v_0)_S$ represents the flow coefficient which occurs as a consequence of a cooling air supply according to the prior art. In a quasi steady-state range between $t_1$ and $t_2$, in which the differential coefficient of $(v/v_0)_S$ tends to 0, critical stress amplitudes, which can cause damage, occur in the blading. The shaded region B corresponds to the region B shown in FIG. 3.

FIG. 3 shows the relative stress amplitude $\sigma/\sigma_0$ of a typically affected long blade/vane for quasi steady-state conditions, or more precisely as a function of the relative flow coefficient $(v/v_0)$. Whereas, under quasi steady-state conditions, this parameter $(v/v_0)$ is reduced, it first passes through a phase D of low stress amplitudes, such as arise during normal turbine operation. After this, the stress amplitudes increase slowly during a transition phase C. During a next phase B, the stress amplitudes of the large blades/vanes attain critical levels and, after this, they fall rapidly in the last phase or windage phase A. During the run-down, it is therefore important to pass through the phase B with the critical stress amplitudes as rapidly as possible in order to avoid inter alia dangerous blading vibrations and possible blading damage.

Finally, in the case of a different rotational speed function, such as, for example, without overspeed or larger or smaller speed gradients, inappropriately high or low temperatures occur with this time-dependent supply of cooling air.

SUMMARY OF THE INVENTION

The object of the present invention is to create a safe and protective cooling method for an air storage gas turbine, which method is employed inter alia during the run-down or idling of the turbine after closure of the supply valves for the working medium of the turbine. The cooling method is, in particular, intended to avoid thermal stresses in the components of the turbine due to non-optimum cooling and high stress amplitudes resulting from blading aerofoil vibrations.

This object is achieved by means of a method according to claim 1.

In the turbine cooling method according to the invention, the mass flow of a cooling medium is turned down, after shut-off of the supply of the turbine working medium, in proportion to a third power of the peripheral velocity of the blades or the third power of the rotational speed of the rotor. This control of the supply of the cooling medium reduces the mass flow during the run-down of the turbine to suit the rotor speed and reduces it to a sufficient extent, as compared with the method mentioned of the prior art. Due to the control, according to the invention, of the cooling air supply, only as much heat is removed as occurs due to windage. This ensures that the temperature of the critical turbine components remains within an acceptable range, i.e. the components do not overheat but are not excessively cooled either. No significant, transient thermal stresses in the components occur either, therefore, because undercooling or overcooling are avoided.

For a certain peripheral velocity of the blades, the reduced mass flow of the cooling medium ensures that the relative stress amplitudes of the long blades are minimized and remain at a level under the maximum blade vibration amplitude, by which means the risk of blade damage is completely checked. In effect, the cooling method according to the invention has the result that during the reduction of the mass flow through the turbine, the critical phase B shown in FIGS. 2 and 3 is only passed through once, and is passed through rapidly, and in consequence intolerably high stress amplitudes cannot appear. After the windage phase A has been reached, the critical phase B is no longer attained because of the reduced mass flow of the cooling medium; in consequence, the major part of the run-down of the turbine takes place in the safe and risk-free windage region A.

In a preferred cooling method, the supply of the cooling medium is realized with a time delay after the supply of the working medium has been shut off. This provides the advantage that any turbine drive is avoided, particularly in the case of a rapid shut-down with overspeed.

In a further preferred cooling method, the supply of the cooling medium is started as soon as the differential coefficient with respect to time of the rotational speed has a negative value. In the case of overspeed, this method avoids any overtemperatures in the turbine.

In a preferred cooling method, the cooling medium is admitted via the turbine inlet and/or via the cooling systems of the rotor and the guide vanes. A supply via the blading duct and/or via the cooling systems for the rotor and the blading permits sufficient cooling of the last two turbine blading rows and the adjacent components such as, for example, the diffuser duct, blading supports and rotor. The cooling of the last stage is, in particular, ensured because the temperature difference between the cooling medium and the last blading rows, which have to be cooled, is still sufficient for an adequate cooling effect. The method also ensures that all the critical components, in particular the rotor and the last two stages, are sufficiently cooled.

In the case where the cooling method is applied to an air storage gas turbine, the cooling medium is introduced before the low-pressure turbine, preferably via the cooling systems of the rotor and the guide vanes. Tempered air, preheated to an adequate temperature, is preferably used for cooling. This can, for example, be preheated in a recuperator. In the case of an air storage power installation, a reduction in the mass flow of the cooling air also minimizes the loss of stored energy.

The cooling method according to the invention can also be employed in the case of steam turbines, in particular in the case of a vacuum failure and accelerated run-down of the steam turbine.

Because the cooling method according to the invention is independent of time, it also ensures sufficient cooling in the case of faults such as delayed or accelerated run-down of the turbine for which, otherwise, no sufficient cooling air supply could occur.

DETAILED DESCRIPTION OF THE INVENTION

Figure 1:
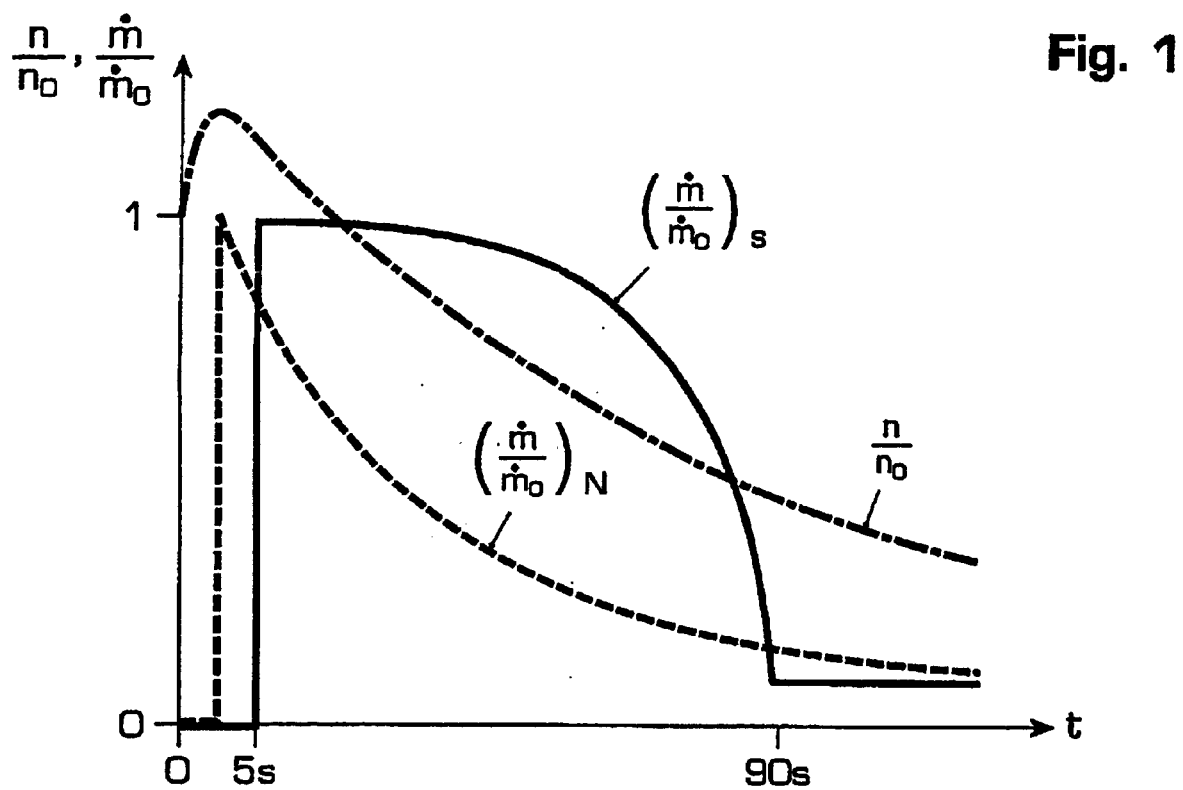
FIG. 1 shows a representation of a cooling method subsequent to a rapid closing of the turbine valves according to the prior art and according to the invention. The full curve shows the relative mass flow of the cooling medium $m/m_0$ which is admitted to the turbine according to the prior art; the dashed curve shows the corresponding supply of cooling medium according to the invention. A rotational speed function for the same period is also given.
Figure 2:
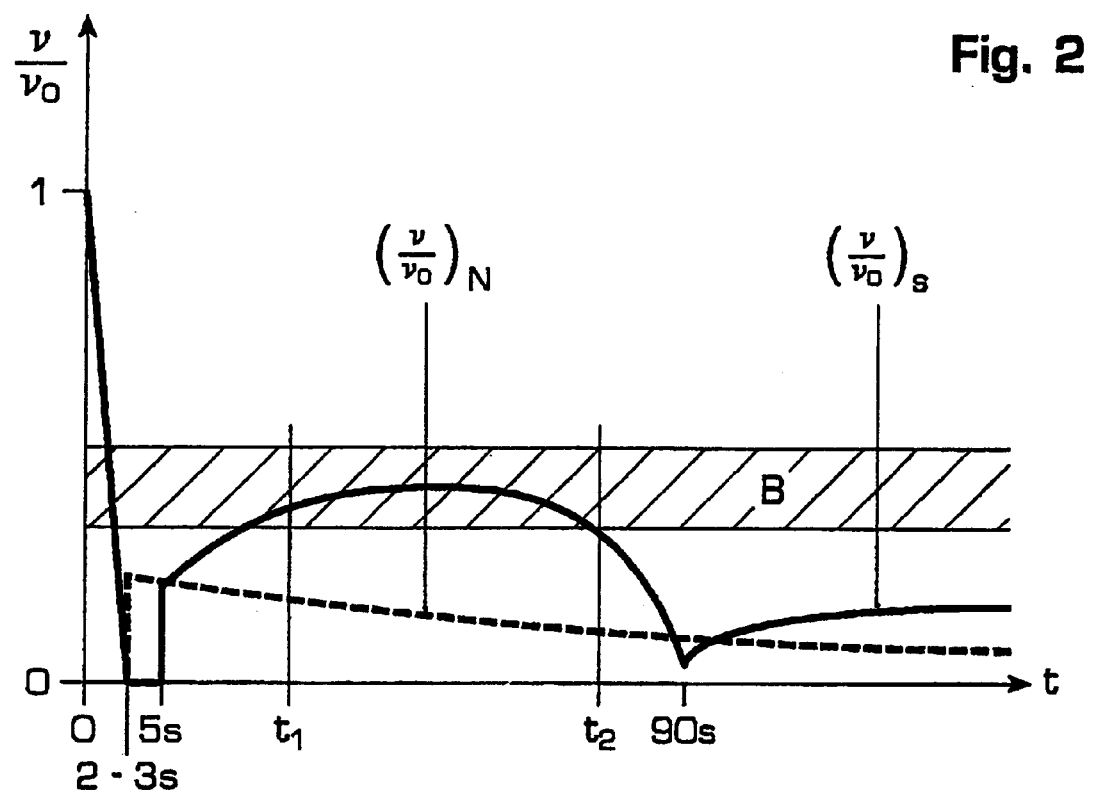
FIG. 2 shows a representation of the relative flow coefficient $(v/v_0)_S$ and $(v/v_0)_N$ according to the prior art and the invention, respectively.
Figure 3:
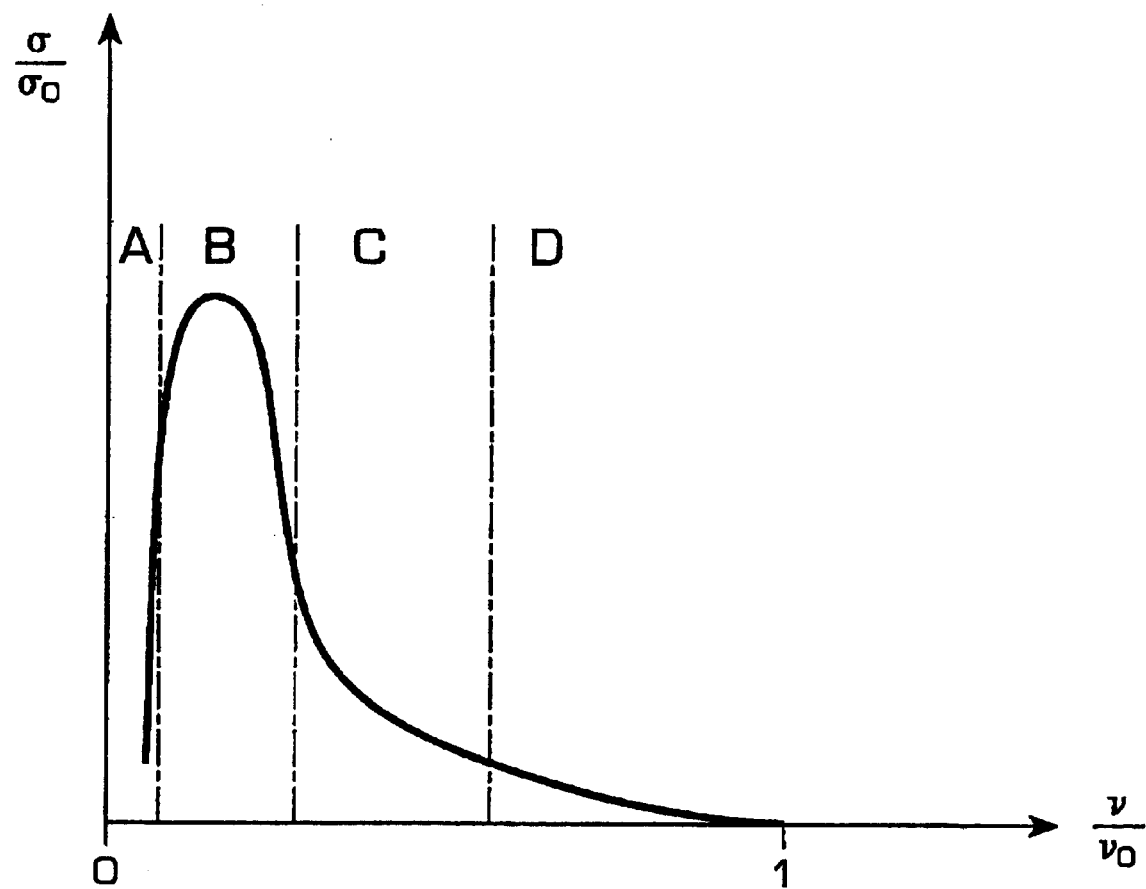
FIG. 3 shows a representation of the relative stress amplitudes $\sigma/\sigma_0$ of the vibrations of blading of the last blading row, such as can occur with a cooling method of the prior art according to FIG. 1.

FIGS. 1 to 3 have already been partially explained in association with the description of the prior art.

In FIG. 1, a chain-dotted curve shows the rotational speed function $n/n_0$ after the rapid closing of the turbine valves, n being the rotor rotational speed. The rotational speed rises initially to approximately 120% of the rotational speed at the time of the rapid closure and subsequently falls gradually, reaching approximately 10% of the initial rotational speed after approximately 20 minutes. From this curve, it is possible to calculate the actual heat which is generated in the turbine and has to be removed by cooling. Consideration of the rotational speed function and of the cooling air supply according to the prior art shows that there is a lack of supply until the opening of the valves for the cooling air supply and that there is subsequently a surplus of cooling air. FIG. 1 additionally shows, as a dashed curve line in comparison with the full curve for the relative mass flow of the cooling medium according to the prior art, the relative mass flow $(m/m_0)_N$ of a cooling medium according to the invention. The relative mass flow $(m/m_0)_N$ of the cooling medium is admitted as a function of time and proportional to the third power of the rotor rotational speed or the third power of the peripheral speed of the blades. It is, in particular, clear that this mass flow falls rapidly at the beginning of the cooling process and, as a result, the blading vibrations do not pass into the critical ranges B of FIGS. 2 and 3.

The relative flow coefficient $(v/v_0)_N$ is represented as a dashed curve in FIG. 2. In the period between $t_1$ and $t_2$, the differential coefficient with respect to time of $(v/v_0)_N$ does not pass through the critical region and, therefore, no critical vibrations, such as is the case in the method according to the prior art, are caused.

After the closing of the valves for the supply of the working medium, the turbine passes through the curve of FIG. 3 from the region D of the normal operation, in the direction of the reducing axial mass flow through the turbine, as far as the region A during which the turbine finally idles. The cooling medium commences to be admitted at this time, after which the procedure runs through the region A again in the direction of increasing axial velocity due to the increasing axial flow. Because, however, the mass flow of the cooling medium is regulated by the rotor rotational speed, only a small part of the region A is run through again. The critical region B is no longer reached. It would only be reached if the mass flow and its axial velocity should exceed a certain magnitude. Dependence of the mass flow on the rotor rotational speed therefore ensures windage operation without danger in the region A.

Figure 4:
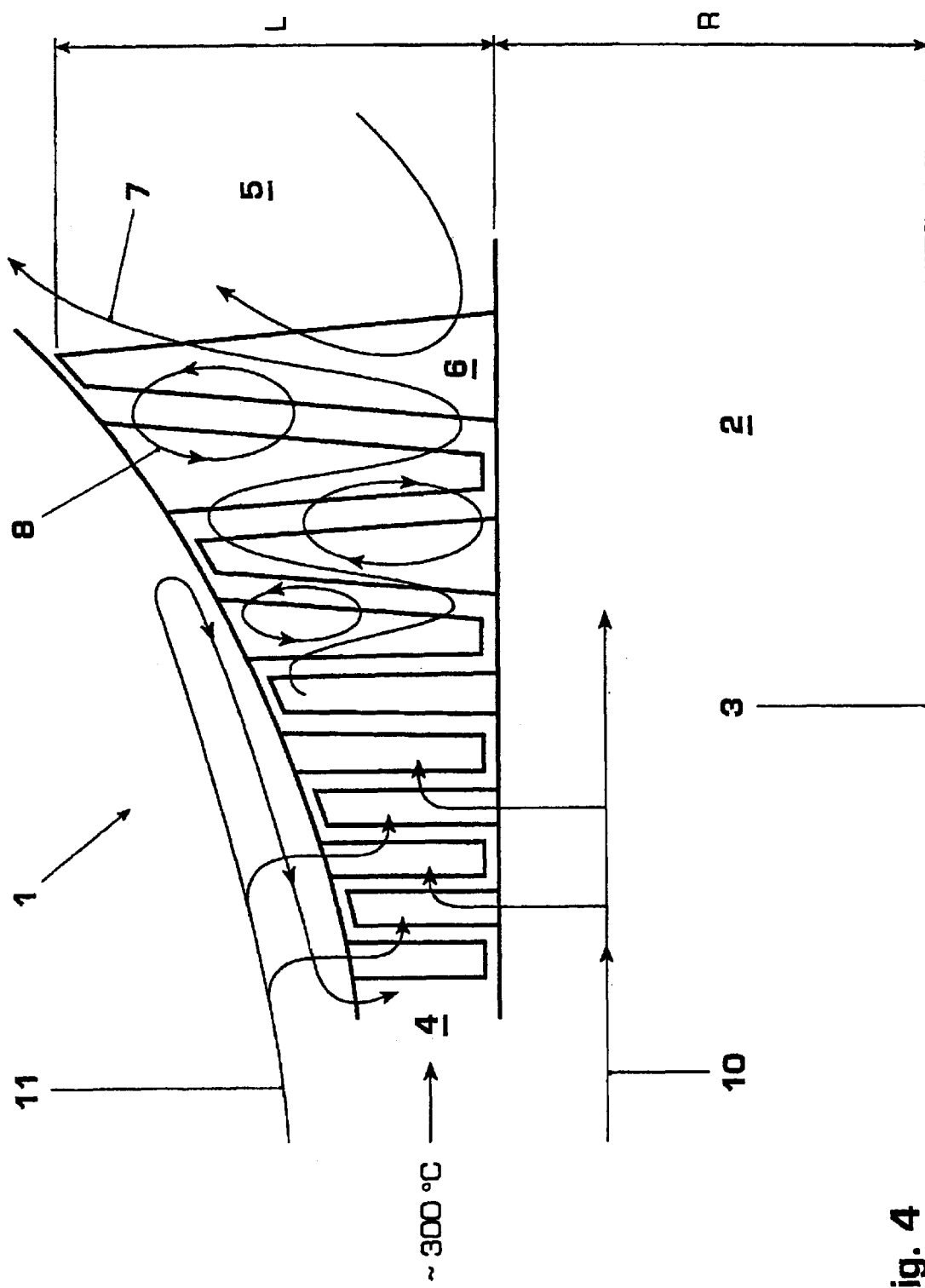
FIG. 4 shows an example of a turbine, in which the cooling medium is admitted before the blading and via the cooling systems of the rotor and blading.

FIG. 4 shows a turbine 1, such as, for example, a low-pressure gas turbine of an air storage power installation. The rotor 2, with rotor center line 3, and a plurality of blading rows between the inlet 4 and the turbine outlet 5 are shown. Of these, the last blading row 6 with a large length L relative to the rotor radius R is, in particular, affected by critical blading vibrations during the run-down of the turbine. After the supply of the working medium for the normal operation has been closed, a windage flow occurs which typically exhibits a meander shape, as shown by the curve 7, and which can initiate blading vibrations. Eddy-type flows, as shown by the curves 8, also occur. The cooling medium is admitted to the turbine via the inlet 4 and, in particular, by opening the valve cross sections to suit the requirements and in proportion to the third power of the rotor rotational speed. In a particular embodiment, the cooling medium is admitted to the turbine via the cooling systems 10 and 11 for the rotor and the stator. By this means, the two last stages are also sufficiently cooled, a relatively small difference existing between the temperature of the cooling medium and that of the blading material in order to avoid stresses due to the temperature difference between cooling air and components. A cooling medium, which is introduced at the inlet 4, is preheated by means of a recuperator to an adequate temperature of approximately 300° C., for example. When passing through the turbine, the cooling air is gradually heated from approximately 300° C. to approximately 500° C. so that, on reaching the last blading row, a small temperature difference exists.

List of Designations
1 Turbine
2 Rotor

3 Rotor center line
4 Turbine inlet
5 Turbine outlet
6 Final row of blades
7 Mass flow of the cooling medium in windage operation
8 Eddy
10 Rotor cooling system
11 Guide vane cooling system
L Blading length
R Rotor radius
$\sigma/\sigma_0$ Relative stress amplitude
$(m/m_0)_N$ Relative mass flow through the turbine according to the invention
$(m/m_0)_S$ Relative mass flow through the turbine according to the prior art
v Flow coefficient or axial velocity according to the invention of the mass flow relative to the peripheral velocity of the blades
n Rotational speed of the rotor

What is claimed is:

1. A method of cooling a turbine after the closing of the turbine valves for the supply of a working medium, wherein the mass flow of a cooling medium, which is admitted to the turbine, is proportional to the third power of the rotational speed (n) of the turbine rotor.

2. The method as claimed in claim 1, wherein the cooling medium is admitted to the turbine with a time delay after the closing of the turbine valves for the supply of a working medium.

3. The method as claimed in claim 1, wherein the cooling medium is admitted to the turbine when a negative gradient with respect to time of the rotor rotational speed (n) is attained.

4. The method as claimed in claim 1, wherein the cooling medium is admitted via the inlet to the turbine and/or via the cooling system of the stator and/or the cooling system of the rotor.

5. The method as claimed in claim 1, wherein the cooling medium has been preheated to adequate temperature before being supplied to the turbine.

6. The use of the method according to claim 1 in an air storage turbine.

7. The use of the method according to claim 1 in a steam turbine, in particular in the case of a vacuum failure.

* * * * *